Patented Dec. 25, 1951

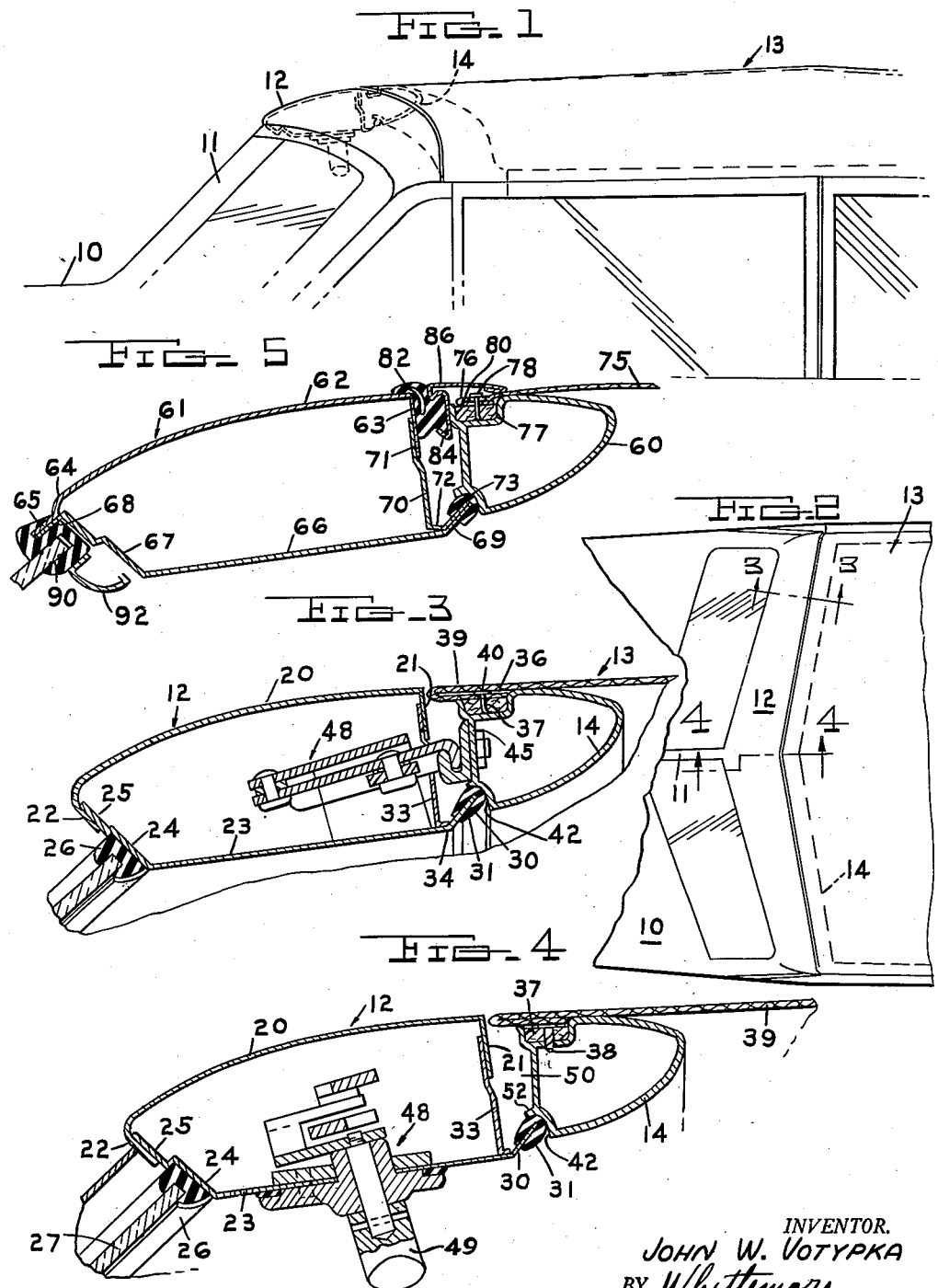

2,580,336

UNITED STATES PATENT OFFICE 2,580,336

HEADER BAR CONSTRUCTION FOR FOLDING TOPS

John W. Votypka, Detroit, Mich., assignor, by mesne assignments, to Detroit Harvester Company, Detroit, Mich., a corporation of Michigan Application November 12, 1948, Serial No. 59,474

3 Claims. (Cl. 296—137)

The present invention relates to header bar construction for folding tops.

It is an object of the present invention to provide improved header bar construction for folding tops characterized by the improved appearance of the header bar constructions, the economy with which they may be produced and their efficiency in operation.

It is a feature of the present invention to provide a fixed and movable header bar for folding-top construction, each of which is formed of flat metal stock rolled and welded into desired cross section in which the space between the header bars serves as a drainage gutter and in which a flange extending from one of the header bars to a recess in the other header bar forms a bottom wall for the gutter.

Other objects and features of the invention will become apparent as the description proceeds, especially when taken in conjunction with the accompanying drawings, wherein:

Figure 1 is a fragmentary side elevation of a motor vehicle illustrating the use of the improved header bar construction;

Figure 2 is a fragmentary plan view of the top construction shown in Figure 1;

Figure 3 is a section on the line 3—3 of Figure 2;

Figure 4 is a section on the line 4—4 of Figure 2; and

Figure 5 is a view similar to Figure 3 of a somewhat modified construction.

Referring first to Figures 1 and 2, the invention is applied to a motor vehicle 10 having a windshield 11 carrying at its top a fixed header bar 12. The vehicle is provided with a folding top construction 13 which includes a movable header bar 14. Suitable guide linkage connects the header bar 14 to the vehicle and serves to guide the header bar so that it moves substantially horizontally as it approaches the fixed header bar 12.

Referring now to Figures 3 and 4, the fixed header bar 12 is constructed of flat metal stock formed to the configurations illustrated. More specifically, it comprises a shaped strip 20 having a depending flange 21 at its rear edge and a downwardly and rearwardly inclined flange 22 at its front edge. A second strip 23 is provided with an upwardly and forwardly extending flange 24 having an offset portion 25 defining therewith a seating groove for receiving a grommet 26 for supporting the windshield 27. The rear edge of the strip 23 is formed upwardly and rearwardly to provide a flange 30 which is provided with a sealing gasket of rubber or the like indicated at 31. A third strip 33 is provided having a short attaching flange 34 welded or otherwise secured to the strip 23 and its upper edge is welded or otherwise secured to the depending flange 21 formed on the top strip 20. The flange 21 and the strip 23 together combine to define a generally vertical rear face for the fixed header bar 12.

The movable header bar 14 is formed of flat metal stock shaped to provide an upwardly opening channel 36 in which is received a tacking strip 37 which is permanently secured therein by tacks 38 or the like. The forward edge of the top material 39 is tacked or otherwise secured to the tacking strip 37 by tacks 40 or the like. At its forward lower corner the header bar 14 is provided with a forwardly and downwardly facing recess 42 which receives the flange 30 and more particularly the sealing gasket 31 carried thereby so as to provide a weather-tight seal. Intermediate the recess 42 and the channel 36 the movable header bar 14 is provided with a generally vertical front face portion 45. The front face of the movable header bar and the rear face of the fixed header bar are spaced apart in substantially parallel relation to each other as indicated in Figures 3 and 4 when the top is in closed or extended position. Suitable means, such for example as the latch mechanism generally designated at 48 and including a handle 49 depending from header bar 12, is provided to retain the two header bars in the position illustrated in the figures. At this time it will be observed that the cover material 39 extends forwardly of the channel 36 so as to partially overlie the space 50 between the confronting faces of the header bars. Moreover, it will be observed that the vertical depth of the movable header bar 14 is less than the corresponding depth of the fixed header bar 12 and that its upper surface is below the upper surface of the fixed header bar 12. The top material 39 extends forwardly in a double thickness, as illustrated in Figures 3 and 4, to a point spaced slightly to the rear of the adjacent rear top corner of the front or fixed header bar.

It will be understood that the space or gutter 50 defined by the rear face of the fixed header bar 12, the front face of the movable header bar 14 and the interfitting flange 30 and recess 42 extends transversely across the top of the vehicle and extends downwardly to the edges thereof so that water entering this gutter will drain laterally of the vehicle.

The recess 42 which is provided at the lower front corner of the movable header bar 14 is designed to have a forwardly extending flange portion 52 so that it overhangs the flange 30 and the sealing gasket 31. This provides an effectively weather-tight seal, as will be readily apparent. Furthermore, since the flange 30 extends upwardly at an angle as illustrated, it has a certain amount of resilience so that the movable header bar 14 may cooperate therewith to form a weather-tight seal without requiring precise relative positioning between the header bars. Thus, in the relative position illustrated a weather-tight seal is provided. However, further movement of the header bar 14 to the left for a limited distance would be permitted by the slight resilience of the flange 30 without destroying the weather-tight seal.

It will be observed that the fixed header bar 12 extends a substantial distance rearwardly from the top windshield and in fact is designed to form the front portion of the top closure of the vehicle. This is a distinct improvement over prior known constructions in which the fixed header bar at the top of the windshield does not extend rearwardly therefrom, and which require the movable header bar at the forward edge of the collapsible top to move into proximity with the upper edge of the windshield.

Referring now to Figure 5, there is illustrated a somewhat different embodiment of the present invention. In this case the movable header bar 60 located at the forward edge of the folding top is identical with the header bar 14 previously described. However, the construction of the fixed header bar 61 is somewhat different. In this case the header bar 61 comprises an upper strip 62, a downwardly extending flange 63 at its rear edge, and having its forward edge downwardly curved as indicated at 64 and provided with a forwardly and downwardly extending flange 65. The lower portion of the bar 61 is made up of a strip 66, the forward edge of which is upwardly inclined as indicated at 67 and which is provided with a forwardly and downwardly extending flange 68 adapted to engage the flange 65 in flat surface to surface contact. The flanges 65 and 68 are interconnected, such for example as by welding. The rear edge of the strip 66 is inclined upwardly and rearwardly to provide the flange 69.

Interconnecting the upper strip 62 and the lower strip 66 at the rear edge thereof is a third strip 70 having an upper portion 71 which engages the flange 63 in surface to surface contact and is preferably welded thereto. The lower edge of the strip 70 is provided with a rearwardly extending flange 72 which terminates in an upwardly and rearwardly extending flange portion 73. The flange portion 73 and the flange 69 abut in surface to surface contact and are preferably welded together.

In this case the fabric or other flexible cover material 75 is reversely folded as indicated at 75 and is tacked to the tacking strip 77 as indicated at 78.

In order to close the space between the channel 80 located at the upper edge of the movable header bar 60, and the rear face of the forward header bar 61, a gasket 82 of rubber or other suitable material is retained within a metal supporting strip 84 which is suitably secured to the forward edge of the channel 80 and includes an overlying trim strip 86 adapted to conceal the tacks 78.

At the forward edge of the fixed header bar 61 a windshield retaining grommet 90 is mounted on the flanges 65 and 68 and preferably a trim strip 92 is provided at the interior of the vehicle which serves to conceal the juncture between the grommet 90 and the wall 67 of the header bar 61.

The present construction is characterized by extreme rigidity, the economy with which it may be manufactured, and its improved utility in use as heretofore pointed out.

The drawings and the foregoing specification constitute a description of the improved header bar construction for folding tops in such full, clear, concise and exact terms as to enable any person skilled in the art to practice the invention, the scope of which is indicated by the appended claims.

What I claim as my invention is:

1. Header bar construction for a vehicle having a folding top, comprising a transversely extending windshield header bar, and a transversely extending movable header bar for a folding top, said header bars being side by side in substantially common horizontal plane with the opposed faces thereof spaced apart, one of said header bars having a downwardly and forwardly opened recess, and means forming with said opposed faces a gutter for drainage of water, including an upwardly inclined flange on the other of said header bars, and a gasket on said flange and engaging said recess to provide a weather-tight seal, said flange having a certain amount of resilience and being operable to maintain said tight seal.

2. Header bar construction for a vehicle having a folding top, comprising a transversely extending windshield header bar, and a transversely extending movable header bar for a folding top, said header bars being side by side in substantially a common horizontal plane with the opposed faces thereof spaced apart, one of said header bars having along its lower edge a continuous recess open downwardly and toward the other of said header bars, and means forming with said opposed faces a gutter for drainage of water, including an upwardly inclined flange on the other of said header bars, and a gasket on said flange and engaging said recess to provide a weather-tight seal, said flange having a certain amount of resilience and being operable to maintain said tight seal.

3. Header bar construction for a vehicle having a folding top, comprising a transversely extending windshield header bar of substantial width and extending rearwardly from the top of said windshield, and a transversely extending movable header bar for a folding top, said header bars being side by side in substantially a common horizontal plane with the opposed faces thereof spaced apart, lock mechanism for said header bars comprising an actuating handle extending downwardly from beneath said windshield header bar and including means for drawing said movable header bar forwardly toward said windshield header bar, one of said header bars having along its lower edge a continuous recess open downwardly and toward the other of said header bars, and means forming with said opposed faces a gutter for drainage of water, including an upwardly inclined flange on the other of said header bars, and a gasket on said flange and engaging said recess to provide a weather-tight seal, said flange having a certain amount of resilience and being operable to maintain said tight seal as said movable header bar is drawn forwardly toward said windshield header bar.

JOHN W. VOTYPKA.

REFERENCES CITED

The following references are of record in the file of this patent:

UNITED STATES PATENTS

| Number | Name | Date |
|---|---|---|
| 1,893,351 | Austin | Jan. 3, 1933 |
| 2,155,275 | King | Apr. 18, 1939 |
| 2,184,537 | Valletta | Dec. 26, 1939 |
| 2,305,715 | Keller | Dec. 22, 1942 |

FOREIGN PATENTS

| Number | Country | Date |
|---|---|---|
| 503,407 | Great Britain | Apr. 3, 1939 |
| 691,066 | Germany | May 15, 1940 |
| 850,707 | France | Dec. 23, 1939 |